United States Patent [19]
Greene

[11] 3,834,006
[45] Sept. 10, 1974

[54] METHOD OF ASSEMBLING SUPPORTING PINS WITHIN A CASTER WHEEL PIVOT BOSS BORE

[75] Inventor: Frederick C. Greene, St. Joseph, Mich.

[73] Assignee: Shepherd Products U.S. Inc., St. Joseph, Mich.

[22] Filed: Apr. 11, 1973

[21] Appl. No.: 349,950

Related U.S. Application Data

[62] Division of Ser. No. 131,339, April 5, 1971, Pat. No. 3,755,852.

[52] U.S. Cl. .................. 29/436, 29/451, 29/525
[51] Int. Cl. .............................................. B23p 19/00
[58] Field of Search ............ 29/434, 436, 451, 525; 16/18 A, 38, 43, 169

[56] References Cited
UNITED STATES PATENTS

| | | | |
|---|---|---|---|
| 643,468 | 2/1900 | Clark | 16/38 |
| 1,458,812 | 6/1923 | Fay | 16/38 |
| 2,457,647 | 12/1948 | Dodge | 29/436 |
| 2,706,126 | 4/1955 | Thiry | 29/436 X |
| 2,840,382 | 6/1958 | Velepec | 29/451 UX |
| 2,911,460 | 11/1959 | Oxley | 29/451 UX |
| 2,921,808 | 1/1960 | David | 29/451 UX |
| 2,973,546 | 3/1961 | Roche | 16/43 |
| 2,992,449 | 7/1961 | Haydock | 16/43 |
| 3,135,013 | 6/1964 | Parsons | 16/169 |
| 3,197,802 | 8/1965 | Fontana et al. | 16/38 X |

Primary Examiner—Charlie T. Moon
Attorney, Agent, or Firm—Mann, Brown, McWilliams & Bradway

[57] ABSTRACT

A tilted axle caster pivot fastening. The pivot is formed with an end enlargement without the necessity for machining operations and is received within a plastic sleeve which is frictionally engaged with the inner end portion of the pivot boss bore in the caster body.

3 Claims, 12 Drawing Figures

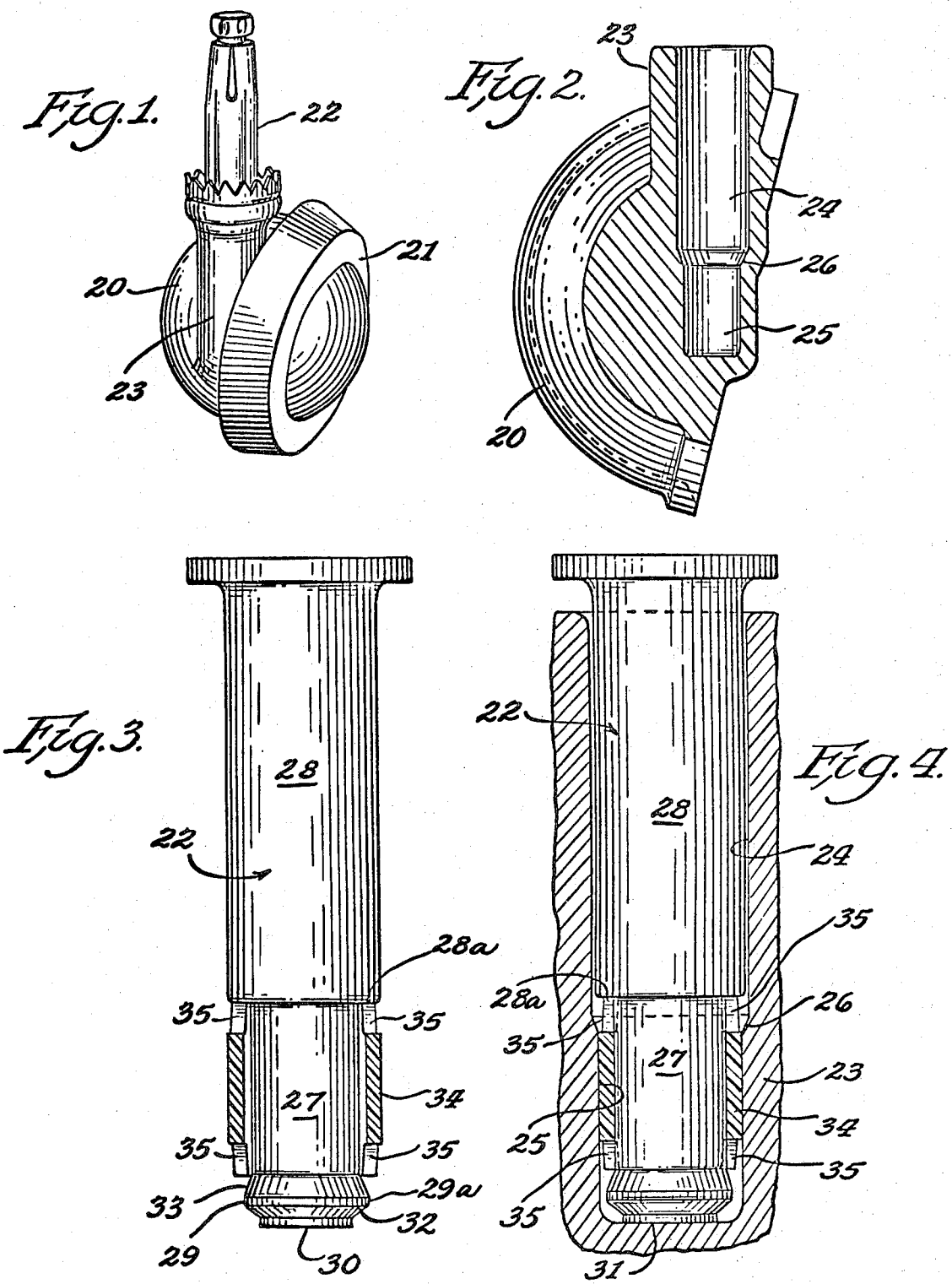

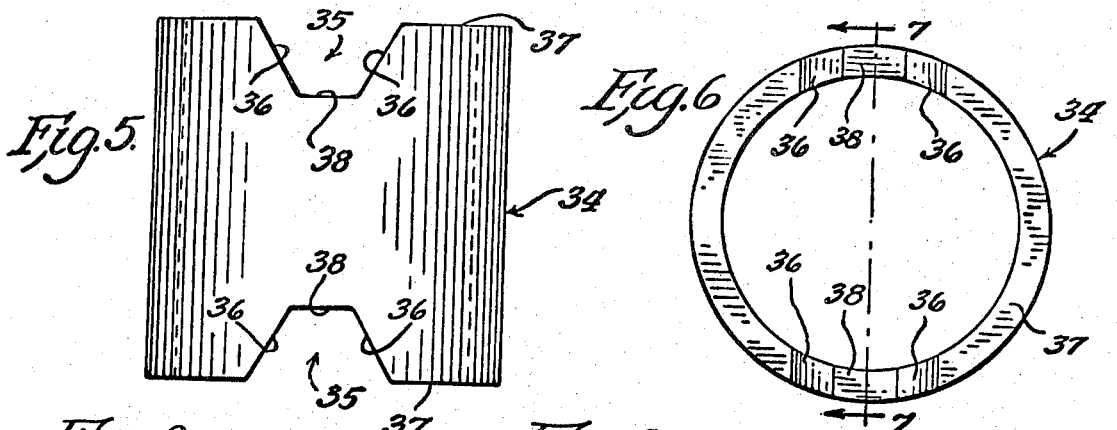
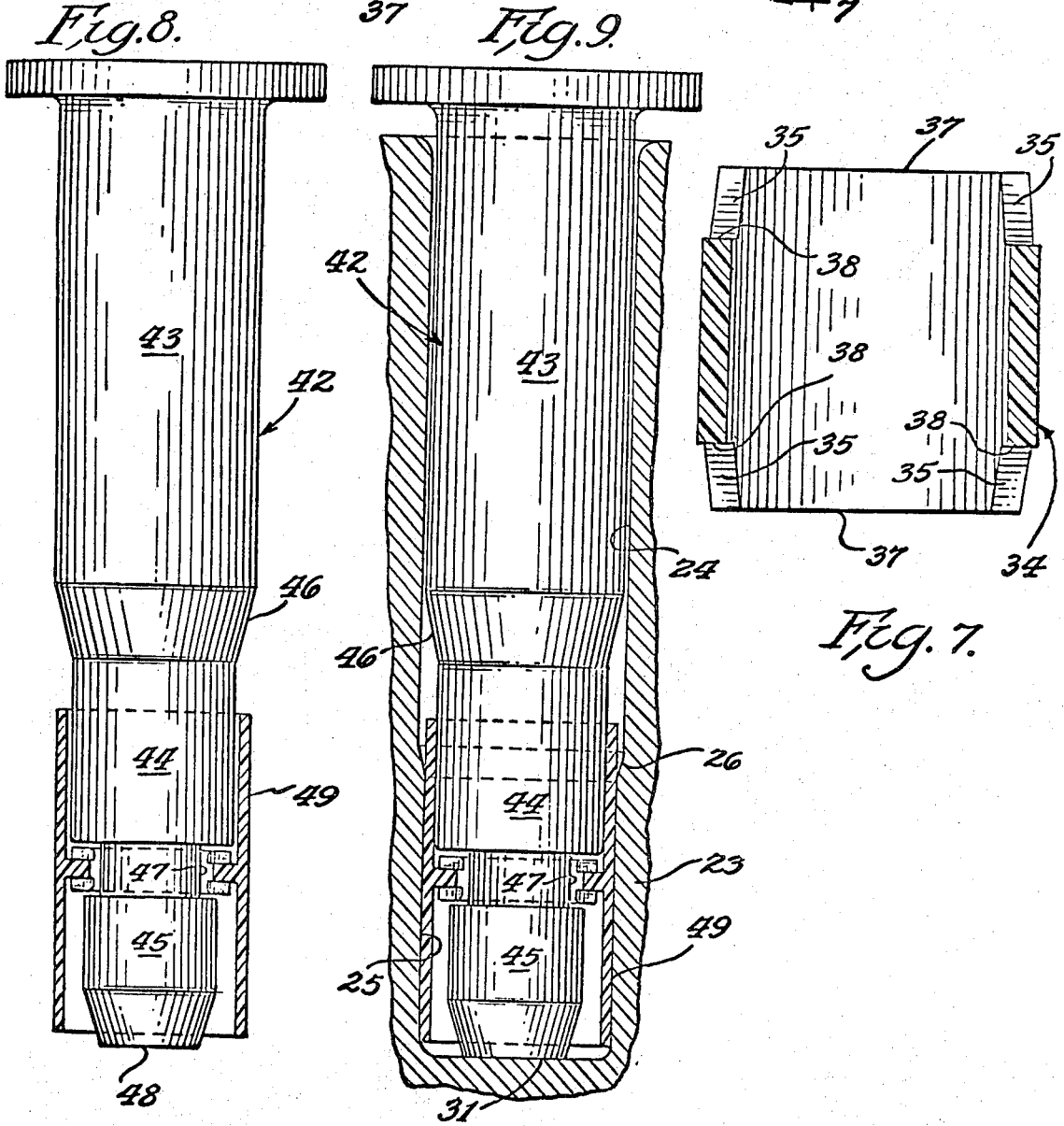

METHOD OF ASSEMBLING SUPPORTING PINS WITHIN A CASTER WHEEL PIVOT BOSS BORE

This application is a divisional application of my copending application, Ser. No. 131,339, filed Apr. 5, 1971, now U.S. Pat. No. 3,755,852.

The present invention is directed to tilted axle casters and is particularly concerned with improvements in the assembly of a pivot fastening in the caster body.

Tilted axle caster pivots have been held in caster bodies by a variety of means. In some cases a groove is formed on a pivot and a pin is passed through the caster body and engaged with the groove in order to hold the pivot within the body. In other cases spring rings have been assembled on a groove defined in the caster pivot and this ring is then engaged with a groove in the pivot boss bore in the caster body. Price et al. U.S. Pat. No. 3,177,516 discloses several pivot fastenings for plastic caster bodies, including flange and groove engagements between a pivot and the pivot boss bore. All of these methods of holding pivots within the caster body require machining operations on the pivot and/or especially molded plastic bodies.

The major purposes of the present invention are to form caster pivots and pivot receiving bores in a manner such that machining operations on the pivot are eliminated (except for machining at the exterior fastening end of the pivot), and to form caster pivots and body assemblies in such a manner that assembly of pivots within metal caster bodies is simpler than previously known methods, while at the same time providing proper bearing engagement between the pivot and the pivot boss bore in which the pivot is seated.

These and other purposes will become more apparent in the course of the ensuing specification and claims when taken in conjunction with the accompanying drawings, in which:

FIG. 1 is a perspective view of a typical tilted axle caster to which the present invention is applicable;

FIG. 2 is a sectional view of a caster body of the type shown in FIG. 1;

FIG. 3 is a side view of a caster pivot utilized with the caster body of FIG. 2;

FIG. 4 is a view of the pivot of FIG. 3 positioned within the pivot boss bore of the caster body illustrated in FIG. 2;

FIG. 5 is a side view of a plastic sleeve utilized in the assembly of FIG. 4;

FIG. 6 is an end view of the sleeve illustrated in FIG. 5;

FIG. 7 is a sectional view of the sleeve illustrated in FIGS. 5 and 6;

FIG. 8 is a side view of a modified form of caster pivot and sleeve utilizing the principles of the invention but with a different form of pivot and sleeve;

FIG. 9 is a sectional view of the assembled pivot and sleeve of FIG. 8 in a pivot boss bore;

Like elements are designated by like characters throughout the specification and drawings.

Figure 10:
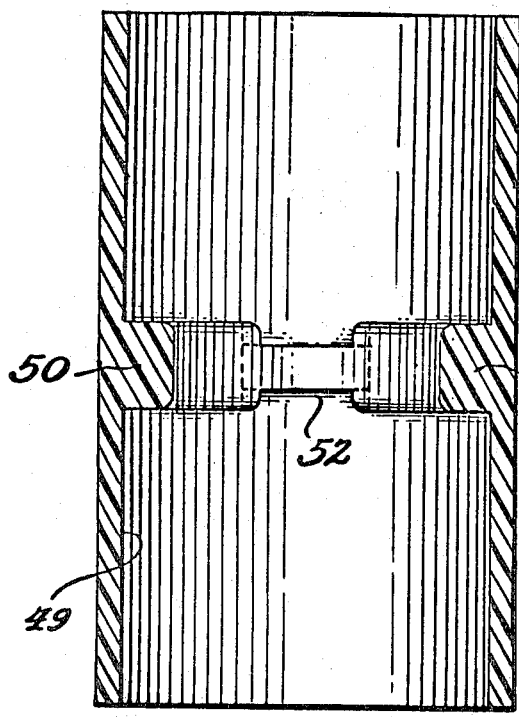
FIG. 10 is a sectional view of the sleeve illustrated in FIGS. 8 and 9.

With particular reference now to the drawings and in the first instance to FIG. 1, a typical tilted axle caster pivot is shown including a caster body 20, a caster wheel 21 rotatably mounted on the body about a tilted axis relative to an upstanding pivot 22 which is received within the bore of a pivot boss 23 in the caster body. The outer portion of the pivot 22 may take any one of several known forms, while utilizing the principles of the present invention. The outer portion of the pivot may be formed as a threaded stem, a flat plate with screw holes for fastening, or, as shown in the drawings, a pintle received within the bore of an article to be supported on the caster. The pivot 22 is rotatably received within the bore of the pivot boss 23 to allow rotation of the caster body and wheel about the axis of the pivot. Tilted axle casters as thus described are known to the art.

In accordance with the present invention, the pivot boss bore, as shown in FIGS. 2 and 4, includes an outer cylindrical portion 24 and an inner cylindrical portion 25. The diameter of the outer portion 24 is larger than the diameter of the inner portion 25. The two cylindrical portions are joined by a tapered wall 26 of frusto-conical form. The pivot 22 is formed with an inner cylindrical portion 27 and an outer cylindrical portion 28. A shoulder 28a is at the lower end of outer portion 28. Outer portion 28 is adapted for a rotatable bearing engagement with outer portion 24. The inner end of the pivot is formed with an enlargement 29 as by an upsetting or cold heading process. The inner end face 30 of the pivot is flat and adapted for a bearing engagement with the inner wall 31 of the pivot boss bore. The enlargement 29 has a circular shape (when viewed longitudinally of the pivot) with a maximum diameter spaced from end face 30 a short distance as at 29a and greater than the diameter of the inner cylindrical portion 27. The enlargement 29 is also shaped to provide an inwardly reduced or frusto-conical surface 32 from the maximum diameter 29a to a point spaced slightly from end surface 30 and an outwardly reduced or frusto-conical surface 33 from the point of maximum diameter at 29a to a point of mergence with the inner cylindrical surface 27.

A cylindrical sleeve 34 of distortable material is adapted to surround the inner cylindrical portion 27 when the pivot 22 is received within the bore. Sleeve 34 extends generally for the length of the cylindrical portion 27.

As is seen in FIGS. 5, 6 and 7, sleeve 34 is formed with notches 35 in its opposite end walls at diametrically spaced points. As is seen particularly in FIG. 5, the notches may be defined by tapered surfaces 36 leading inwardly from the end faces 37 and an inner surface 38 spanning the inclined surfaces 36 and spaced inwardly from the end walls 37.

Sleeve 34 may be formed from an acetyl resin or equivalent plastic material. It is formed with an undistorted, external diameter greater than the diameter of the inner portion 25 of the pivot boss bore. It has an undistorted internal diameter greater than the diameter of the inner cylindrical portion of pivot 27. The difference between the undistorted external diameter of the sleeve and the diameter of the inner portion 25 of the bore should be less than the difference between the undistorted internal diameter of the sleeve and the diameter of the inner cylindrical portion 27 of the pivot.

The maximum diameter of the enlargement at 29a should be slightly less than the undistorted internal diameter of the sleeve 34. This difference should be sufficiently small so that when sleeve 34 is distorted by forcing it within the inner portion 25 of the bore, the internal diameter of the sleeve will then be less than the diameter of the enlargement at 29a.

In assembling the pivot 22 within the pivot boss bore, sleeve 34 may be inserted within the outer portion 24 of the pivot boss bore. The inner end of the pivot 22 is then positioned within the sleeve. As the pivot is moved further within the sleeve, shoulder 28a abuts against the outer end of the sleeve and drives the sleeve into the inner portion 25 of the pivot boss bore. It may be noted that the enlargement 29 will freely pass through the sleeve until the shoulder 28a engages the sleeve. As the sleeve moves from the outer portion 24 of the bore, the inner end wall of the sleeve engages the inclined surface 26 of the bore which gradually distorts the sleeve to a diameter allowing it to move into the inner portion 25 of the bore. The distorted condition of the sleeve causes a relatively tight frictional engagement with the wall of the inner portion 25 of the bore. The reduction in the sleeve causes the internal diameter to be less than the internal diameter at point 29 on the enlargement. The pivot is then held within the pivot boss bore by the wedging action of the surface 33 which abuts against the inner end wall of the sleeve. The pivot is then rotatable in the sleeve and pivot boss.

The notches 35 in the sleeve provide lubricant passages from the inner end of the bore, around the enlargement, and between the space between the inner wall of the sleeve and the inner cylindrical portion 27 of the pivot.

By virtue of the assembly, the part of the pivot which fits within the pivot boss bore can easily be formed from wire stock with a cold heading process. The sleeve 34 can either be preassembled with the pivot and then inserted within the bore, or the sleeve may simply be dropped into the outer portion 24 of the bore, whereupon the pivot is inserted within the pivot boss bore. The invention simplifies automated or semi-automated assembly, because assembly involves only the simple linear movement of the parts along the axis of the pivot boss bore.

FIGS. 8, 9, 10 and 11 illustrate the principles of the invention applied to caster pivots which have been formed to receive spring fastening rings of the type known to the art and previously described. The principles of the invention may be applied to pivots of this type and thus allow use of pivot stock formed for the purpose of using fastening rings.

In FIGS. 8 and 9 the pivot boss bore is formed in the same fashion as in the previous figures. In these figures a pivot generally designated at 42 has a stepped configuration with an outer cylindrical portion 43 formed for a rotatable bearing engagement with the wall of the enlarged outer end of the bore 24 in the pivot boss. The pivot has a reduced inner end portion defined by a first cylindrical surface 44 and a second, innermost cylindrical surface 45 of smaller diameter than the surface 44. A frusto-conical or tapered surface 46 spans the two cylindrical surfaces 43 and 44. The pivot includes an annular groove 47 between the surfaces 44 and 45. The inner end of the pivot has a frusto-conical form with an end face 48 adapted to abut and bear against the end face 31 of the pivot boss bore. A pivot structure as thus described is known to the art for the purpose of utilizing a fastening ring which is assembled on the groove 47 which is machined in the pivot. In the known practice of pivot structures, the pivot is then inserted into a pivot boss bore where the ring snaps into a holding recess or forms a friction fit with the wall of the bore.

The principles of the invention may be applied to enable use of such pivot stock by using a specially formed distortable plastic sleeve 49. This sleeve may be formed of a plastic material such as delrin, nylon, acetyl resin or equivalent plastic material.

Sleeve 49 is formed with an undistorted, external diameter greater than the diameter of the inner bore 24 but less than the diameter of the outer bore portion 24, as is the case with the sleeve in FIGS. 3-7. The sleeve has an undistorted internal diameter greater than the external diameter of the cylindrical portion 44 so that a clearance space exists between the inner wall of the sleeve and the inner end of the pivot. As is the case with the sleeve in FIGS. 3-7, the relation of diameters is such that when the sleeve 47 is forced within the inner bore portion 25, it is distorted and reduced in diameter, providing a binding frictional engagement with the wall of the inner bore portion 25. In the distorted condition, however, enough clearance exists between the inner wall of the sleeve and the cylindrical portion 44 of the pivot to allow lubricant flow therebetween.

Figure 11:
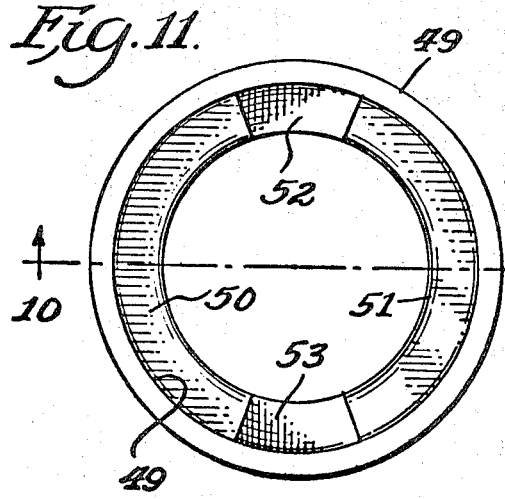
FIG. 11 is an end view of the sleeve illustrated in FIG. 10.

The sleeve 49, as is seen in FIGS. 10 and 11, includes a pair of diametrically opposed flanges 50 and 51 extending around substantial portions of the inner circular wall of the sleeve at the midportion thereof. The flanges 51 and 50 have a thickness, measured parallel to the axis of the sleeve, generally equal to and preferably slightly less than the width of the groove 47 so that they will span the width of the groove 47. The flanges 50 and 51 extend inwardly from the inner wall of the sleeve by a distance such that they are spaced from the inner wall of the groove and are yet positioned between the side walls of the groove in a captivated fashion when the sleeve is assembled with the pivot, as illustrated in FIGS. 8 and 9. The flanges should have radial dimensions such that innermost portion 45 of the pivot will distort them as it passes through until the flanges snap into the groove 47. Webs 52 and 53 span the spaces between the flanges 50 and 51 and are formed integrally with the flanges and sleeve. These webs have an axial dimension less than the axial dimension of the flanges 50 and 51 and a radial dimension the same as that of the flanges. This provides lubricant flow spaces through the space around the webs 52 and 53 and to and from the space around the pivot portions 44 and 45 when the sleeve captivates the pivot.

Without the lubricant flow spaces through the notches 35 in FIG. 4 or around the webs 52 in FIG. 9, the pivot and sleeve could not be inserted within the pivot boss bore if the pivot boss bore contains lubricant, because the sleeve and inner portion of the pivot would act as a piston against the lubricant.

As is the case with the invention disclosed in FIGS. 2-7, the pivot 43-45 may be assembled within the pivot boss bore by simply dropping the sleeve 49 into the outer portion 24 of the bore, whereupon the pivot 42 is inserted within the bore and sleeve and brought into engagement with the sleeve. As inward movement of the pivot continues, the abutment surfaces defined by the flanges 50 and 51 and the outermost wall of groove 47 engage, and continued movement of the pivot forces the sleeve into the inner bore portion 25, thereby distorting the sleeve and creating a frictional engagement with the wall of the bore. The movement continues until the end 48 of the pivot abuts against the inner wall portion 31. The pivot is then captivated by the sleeve and rotatably mounted in the pivot boss. As in FIGS. 1–7, the pivot and sleeve may be preassembled and then moved into the pivot boss bore.

Figure 12:
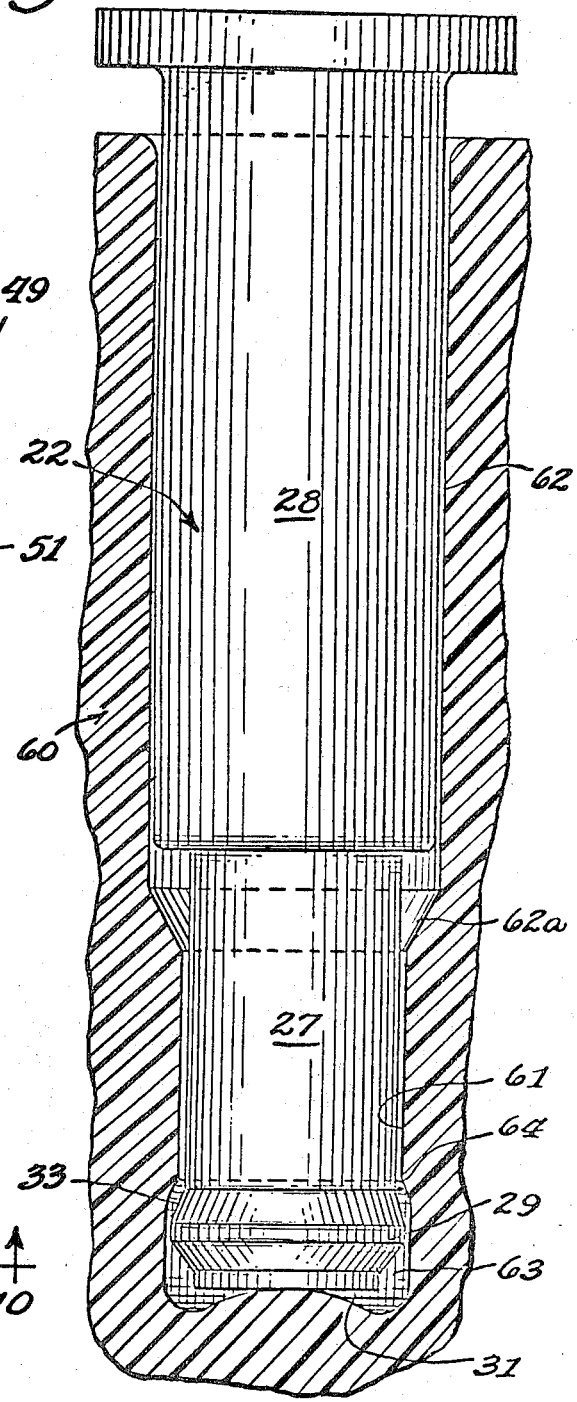
FIG. 12 is a sectional view of another embodiment of the invention.

The specially formed pivot usable in the invention, as disclosed in FIGS. 3–7, may also be used in plastic caster bodies without necessitating use of a sleeve. As shown in FIG. 12, a plastic caster body 60 has a bore defined by an inner cylindrical portion 61 and an outer cylindrical portion 62. A frusto-conical or tapered surface 62a connects the wall surface of the two bore portions. The outer bore portion is larger than the inner bore portion and is adapted to provide rotatable bearing support for the outer portion of the pivot. The inner bore portion terminates in an enlarged recess 63 which is adapted to receive the enlarged portion 29 on the inner end of the pivot. A shoulder 64 between the recess 63 and portion 61 provides a captivating abutment surface for engagement with the abutment surface 33 of the pivot. The diameter of the inner bore portion 61 is less than the maximum diameter 29a of the enlargement on the inner end of the pivot. In FIG. 12 the shape of the bore is easily defined when molding the plastic body. The pivot is simply inserted into the bore and, as the enlargement 29 moves along the inner bore portion 61, it distorts it until the enlargement reaches the recess 63 at the end of the bore. The wedging action of the enlargement tapered surface 33 against the shoulder 64 between the inner bore portion and enlarged recess functions to prevent unintended withdrawal of the pivot from the pivot boss.

Plastic bodies and pivots may be used without lubricants. In some cases lubricant may be desirable. In this event diametrically opposed lubricant passages may be formed along the length of the inner bore portion 61 to allow flow between recess 63 and the space bounded by tapered portion 62a. This prevents a piston effect as the pivot is moved to its captivated position within the pivot boss.

I claim:

1. The method of assembling supporting pivots within a caster wheel pivot boss bore including the steps of forming a pivot boss bore with inner and outer cylindrical portions with the inner cylindrical portion having a smaller diameter than said outer portion and a tapered surface joining said inner and outer portions, forming a supporting pivot with inner and outer portions with the inner portion of smaller diameter than said outer portion, inserting a distortable plastic sleeve having an undistorted external diameter greater than the diameter of the inner portion of said bore in the outer portion of said bore, forming cooperating surfaces on said sleeve and on the inner portion of said pivot, which are abuttable with one another in a distorted, reduced diameter condition of the sleeve, inserting the inner portion of said pivot within said bore and sleeve and continuing axial movement of said pivot within said bore while using engagement of the pivot and sleeve to drive said sleeve into the inner portion of said bore and seat said sleeve in said inner portion of said bore in a binding frictional engagement through distortion of said sleeve, whereby said pivot is held within said bore by engagement of said abutment surfaces preventing axial removal of said pivot from said bore while said sleeve is held within said bore by said frictional engagement.

2. The method of claim 1, wherein said abutment surfaces are defined by an enlargement on the inner end of said pivot and the innermost end wall of said sleeve.

3. The method of claim 1, wherein said abutment surfaces are defined by a projection extending inwardly of said sleeve and the wall of an annular groove on the inner portion of said pivot.

* * * * *